United States Patent [19]

Pfenninger et al.

[11] 4,250,970
[45] Feb. 17, 1981

[54] AUTOMATIC COULTER DEPTH CONTROL

[75] Inventors: Billy J. Pfenninger; Otto Kahler, both of Hutchinson, Kans.

[73] Assignee: Krause Plow Corporation, Hutchinson, Kans.

[21] Appl. No.: 957,361

[22] Filed: Nov. 3, 1978

[51] Int. Cl.³ .................. A01B 19/10; A01B 63/32; A01B 63/114
[52] U.S. Cl. .................. 172/142; 172/178; 172/398
[58] Field of Search ............... 172/138, 166, 489, 139, 172/141, 397, 398, 142, 178

[56] References Cited

U.S. PATENT DOCUMENTS

| | | | |
|---|---|---|---|
| 968,658 | 8/1910 | Hanson | 172/489 |
| 1,446,530 | 2/1923 | Wicks | 172/138 |
| 1,796,629 | 3/1931 | Stabenow | 172/489 |
| 2,286,312 | 6/1942 | Scarlett | 172/138 |
| 2,970,658 | 2/1961 | Kopaska | 172/456 |
| 3,006,422 | 10/1961 | Mighell | 172/142 |
| 3,090,447 | 5/1963 | Hotchkiss | 172/178 |
| 3,225,839 | 12/1965 | Pettit | 172/398 |
| 3,658,362 | 4/1972 | Fackler | 172/166 |
| 3,912,017 | 10/1975 | Rehn | 172/328 |

FOREIGN PATENT DOCUMENTS 135709  7/1960  U.S.S.R. .................. 172/166

Primary Examiner—Richard J. Johnson
Attorney, Agent, or Firm—Schmidt, Johnson, Hovey & Williams

[57] ABSTRACT

A farm implement has a mobile frame from which is suspended a number of chisel plow shanks and a row of rolling coulters ahead of the plows for cutting crop residue to prevent trash buildup and plugging at the plows. A transverse rock shaft on the frame is provided with swingable wheel arms and cranks to which hydraulic piston and cylinder assemblies are connected for raising and lowering the frame, and therefore, the plows and the coulters in unison. The coulters are swingably mounted on the frame for up and down movement relative to the frame as well as fore and aft movement toward and away from the plows. Turnbuckles pivotally interconnecting the coulter supports and the wheel arms impart swinging movement to the coulters during up and down movement of the frame. Accordingly, adequate slicing heights for the cutters are automatically maintained even at shallow plowing depths.

8 Claims, 4 Drawing Figures

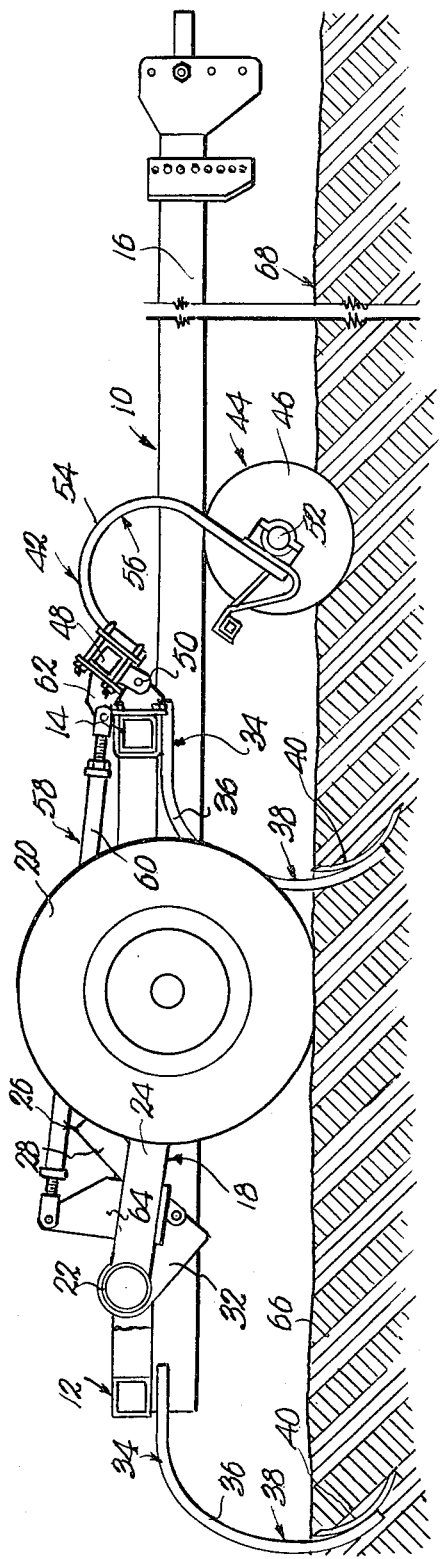
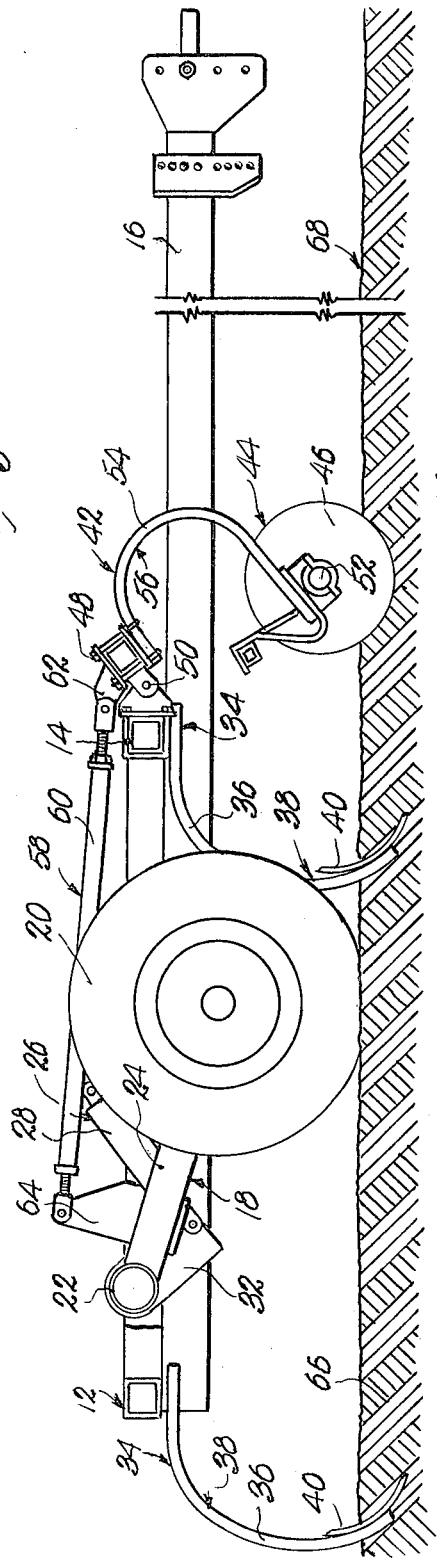

AUTOMATIC COULTER DEPTH CONTROL

Chisel plows using large curved chisels on the lower ends of their arcuate shanks have gained wide acceptance in recent years in the corn belt and in some wheat land areas. Quite common also is to equip these implements with coulter blades ahead of the plows or shovels, mounted either individually or in gangs of four or more to cut crop residue such as stalks, stubble, leaves and root crowns, thereby preventing plugging or bunching of the plows and their shanks.

Normally, such tillage machinery is operated with their shovels set to plow at approximately ten to twelve inches deep into the ground and with the rotatable coulter discs or slicers penetrating the soil about four to five inches. For the most part, it has been found that operating the coulters at greater depths is somewhat impractical because of horsepower requirements for advancing the implement and the weight needed to force and maintain the coulters in the ground.

In any event, during use it oftentimes becomes necessary to decrease the depth of plow penetration because of such factors as change in soil conditions, lack of adequate traction for the tractor wheels, and the climbing of hills and steep slopes resulting in inefficient horsepower to move forwardly at the desired plow and coulter depths. Therefore, when the plows are raised, resulting in a corresponding rise in the coulters, the purpose of the coulters is defeated until the height of the frame can again be lowered during continued advancement; all too frequently the plows quickly become plugged with residue during the time it is necessary to operate at shallower depths. Too often also, this results in the aggravating and difficult task of stopping while the plugging is manually removed from around and between the shovels and their shanks.

In an effort to overcome the problem, various arrangements have been provided to manually adjust the height of the coulter blades in relation to the depth of the chisel shovels, but in no such arrangement does proper adjustment take place automatically in response to increasing or decreasing the depth of the shovels.

In accordance with our present invention, therefore, when the implement frame is raised to in turn raise the shovels, such as to decrease the plowing depth, the coulter-supporting means on the frame also rises. But, there is provided an arrangement wherein the effective ascent of the coulters is subsubstantially minimized such as to retain the cutting effectiveness. Movement of the coulters in relation to the frame maintains substantially the same depth of coulter penetration into the ground during shallower operation of the shovels. We accomplish these results by swinging movement of the coulters about pivot means carried by the frame for up and down movement therewith. By use of extensible links pivotally connected with the coulter gangs, the swinging takes place automatically as the frame is raised and lowered by virtue of an operable connection of the links with the frame height control mechanism which connects the wheels with the frame.

We are familiar with the following prior art patents:

Hanson, U.S. Pat. No. 968,658, raises the frame of a digger with a latch lever which also operates, at the same time, to swing the digging teeth upwardly and rearwardly with respect to the frame.

Kopaska, U.S. Pat. No. 2,970,658, raises the frame of a harrow transport and, at the same time, swings the harrow upwardly and forwardly from a horizontal to an upright position.

Mighell, U.S. Pat. No. 3,006,422, swings the cultivating teeth upwardly and rearwardly as the frame is raised and uses a separate, manual latching lever to initially determine the depth of penetration of the teeth at various frame heights.

Hotchkiss, U.S. Pat. No. 3,090,447, raises a frame to decrease the depth of disc harrow and after the frame reaches a certain height, a drag attachment behind the discs is raised and pulled forwardly.

U.S. Pat. No. 3,225,839 raises a frame to, in turn, withdraw ground-engaging elements from the ground, provision being made for simultaneously swinging the spring teeth at the front of the implement upwardly with respect to the frame as the latter is raised, so as to clear the ground as adequately as the implements disposed rearwardly of the teeth.

Rehn, U.S. Pat. No. 3,912,017, raises and lowers a frame and, through use of a compression spring, raises and lowers a hitch.

In the drawing:

FIG. 3 is a view similar to FIG. 2 showing the positions of the components during normal use; and FIG. 4 is a view similar to FIG. 3 showing the positions of the components when plowing at a depth shallower than illustrated in FIG. 3.

Figure 1:
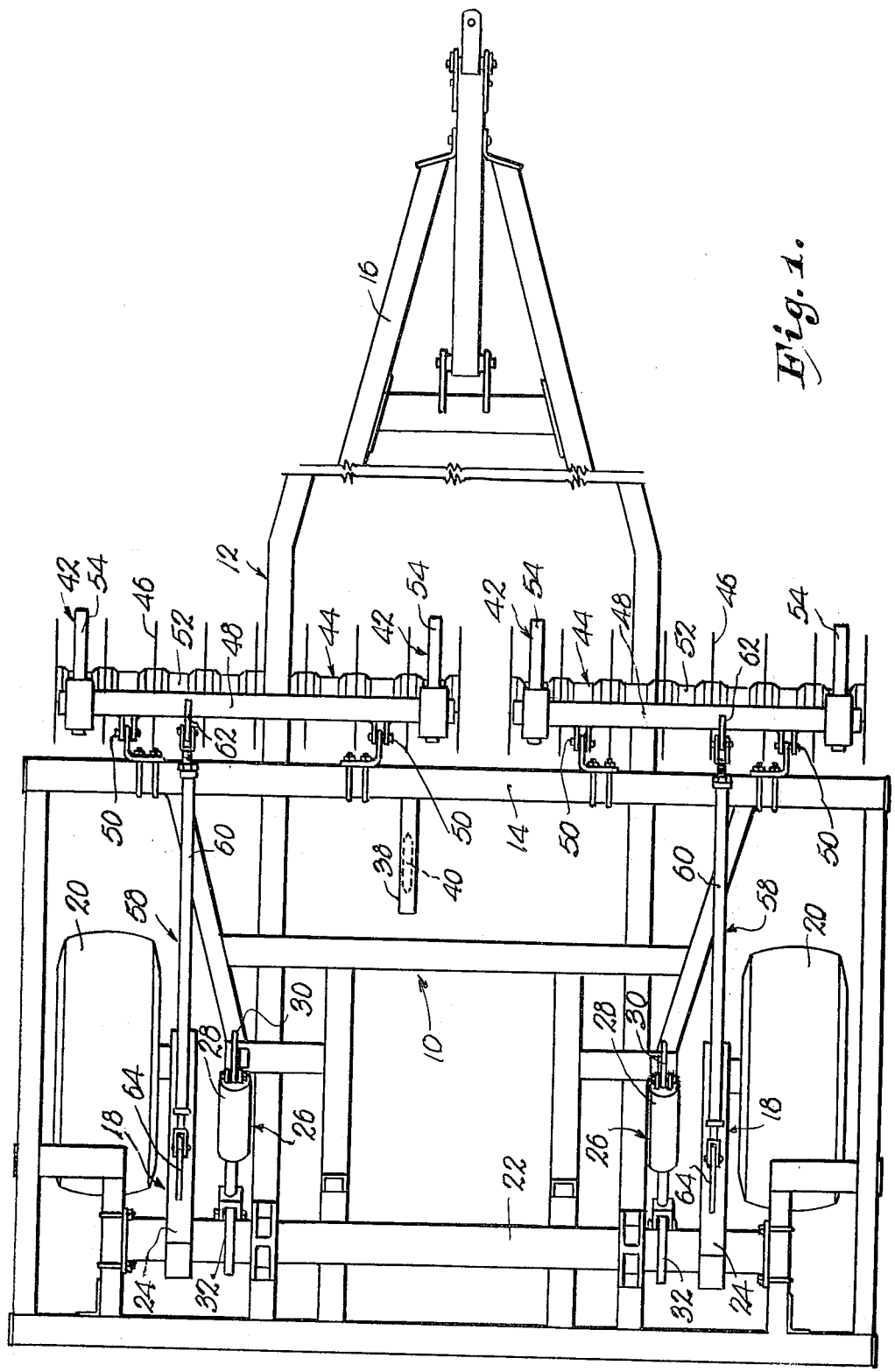
FIG. 1 is a top plan view of a farm implement provided with an automatic coulter depth control made in accordance with our present invention.

Farm implement 10, in the nature of a chisel plow, has a main frame 12 which includes a front cross head 14 and which terminates in a tongue assembly 16 ahead of the cross head 14. Structure 18 connecting a pair of ground-engaging wheels 20 in supporting relationship to the frame 12 includes a rock shaft 22 carried by the frame 12 and provided with an essentially horizontal axis traversing the normal path of travel of the implement 10. The structure 18 also includes an arm 24 for each of wheels 20 respectively, each wheel 20 being rotatably mounted on its arm 24 and each arm 24 being rigid to the shaft 22, extending radially therefrom.

Power means 26 for raising and lowering the frame 12 includes a pair of double-acting fluid pressure piston and cylinder assemblies 28, each pivotally connected to a bracket 30 on the frame 12 and to a crank 32 rigid to and extending radially from the shaft 22.

Tillage means 34, mounted on the frame 12 for up and down movement therewith, includes a plurality of spring shanks 36 carried by the frame 12 at various locations throughout the frame 12. Each shank 36 is arcuate, presenting a forwardly facing, concave edge 38, and a cultivator shovel 40 is mounted on each shank 36 respectively.

Cutter means 42, also mounted on the frame 12 for up and down movement therewith in response to actuation of the assemblies 28, includes two gangs 44 of rotatable coulter blades 46 disposed forwardly of the tillage means 34. Each gang 44 has a beam 48 provided with pivots 50 mounting the beams 48 on the cross head 14 for up and down swinging movement of the cutter means 42 about an axis parallel with the axis of the shaft 22.

Figure 2:
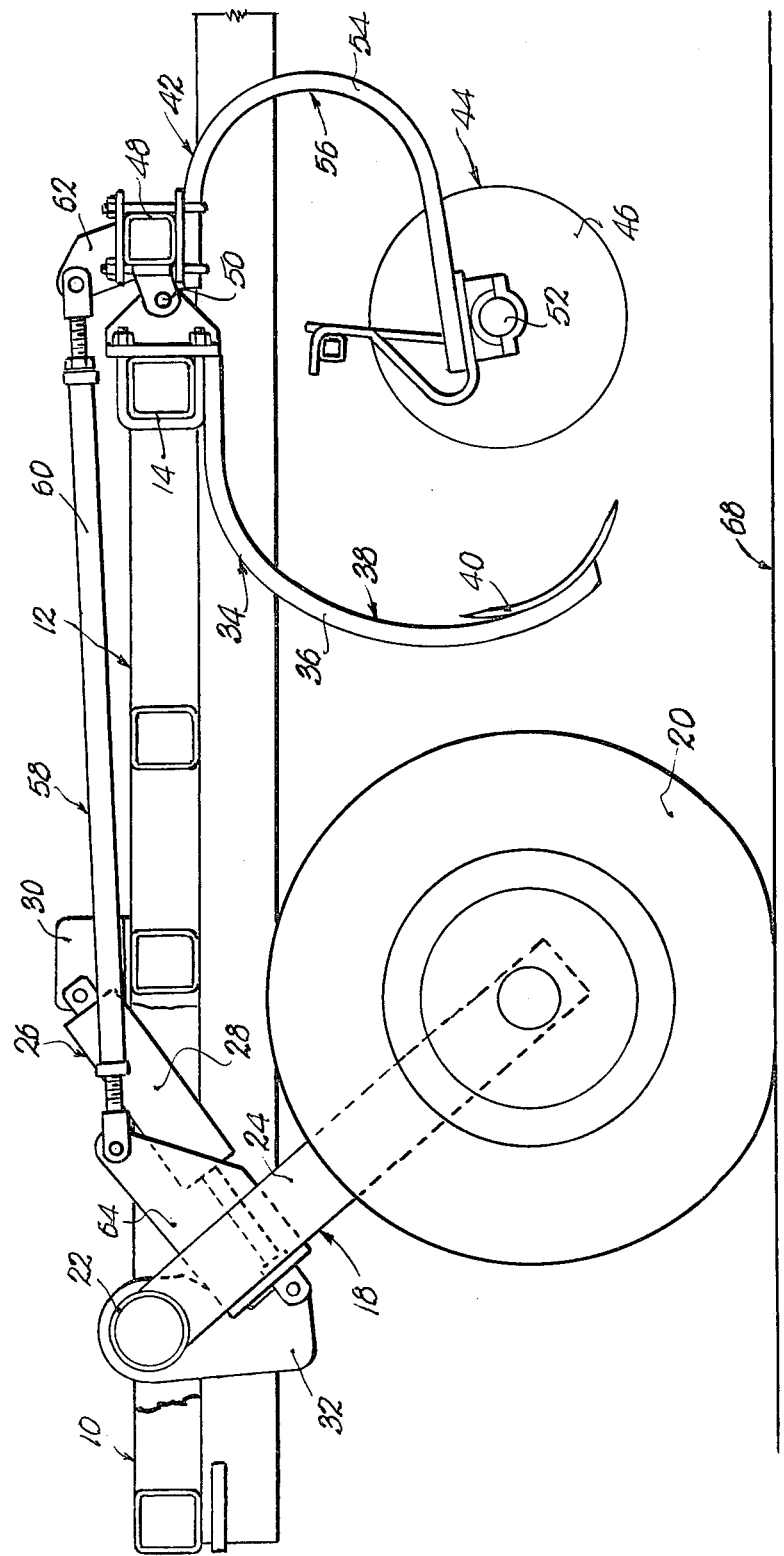
FIG. 2 is an enlarged, fragmentary, side-elevational view of the implement as shown in FIG. 1 depicting the position of the components during over-the-road travel.

Each gang 44 has a blade-supporting shaft 52 carried by a number of C-shaped supporting springs 54 disposed with their concave edges 56 facing rearwardly when the frame 12 is raised as shown in FIG. 2. The springs 54 are, in turn, secured rigidly to the beams 48.

Mechanism 58 operably couples the cutter means 42 with the structure 18 for lowering the cutter means 42 relative to the frame 12 in response to raising of the latter by the power means 26, notwithstanding the fact that the tillage means 34 and the cutter means 42 rise in unison when the frame 12 is raised. The mechanism 58 includes an extensible member 60, such as a link or turnbuckle, for each gang 44 respectively. The turnbuckles 60 extend fore and aft of the implement 10 above the frame 12 and have their forward ends pivotally joined to cranks 62 rigid to corresponding beams 48 with their rearmost ends pivotally joined to cranks 64 rigid to corresponding arms 24.

OPERATION

During normal operation, the frame 12 is lowered as shown in FIG. 3 such that the shovels 40 plow at the maximum depth into the ground 66 and the blades 46 also penetrate the ground 66 to the fullest extent as the wheels 20 advance along the ground surface 68. Under these conditions, the blades 46 operate at their highest efficiency in cutting of crop residue on the surface 68 and, because the blades 46 are spaced well ahead of the proximal tillage means 34, there is little likelihood of buildup and clogging of foreign material between and around the shanks 36.

In the event, however, that it becomes necessary or desirable to plow shallower, the operator on the tractor having the implement 10 in tow, need merely cause operation of the power means 26 while on the go without need to manually manipulate any mechanism whatever for controlling the depth of the blades 46.

As the piston stems of the assemblies 28 are extended, pushing on the arms 24, the shaft 22 is rotated clockwise (viewing FIG. 4) to raise the frame 12 higher. This increase as shown in FIG. 4 of the distance between the frame 12 and the surface 68 raises the shovels 40 to plow at a lesser depth. A corresponding rise occurs in pivots 50 for the cutter means 42.

However, during the clockwise rotation of the shaft 22 and the crank 32, the cranks 64 swing forwardly, imparting a forward pushing movement to the turnbuckles 60 which, in turn, swing the cranks 62 upwardly and forwardly, causing the gangs 44 to rotate clockwise about the pivots 50. The blades 46 therefore swing downwardly and rearwardly toward the tillage means 34. As a consequence, depending upon the selected effective links of the turnbuckles 60, the blades 46 are caused to automatically penetrate the ground 66 at essentially the same depth in FIG. 4 as in FIG. 3 regardless of the shallower penetration of the shovels 40.

If the frame 12 is raised to the position shown in FIG. 2, the shovels 40 and the blades 46 clear the surface 68 for over-the-road travel regardless of the fact that the turnbuckles 60 swing the blades 46 downwardly relative to the frame 12 and rearwardly to a position in somewhat close proximity to the forwardmost shovels 40.

It is to be understood that each of the turnbuckles 60 could be provided with a crank (not shown) rigid to the rockshaft 22 to which the rear ends of the turnbuckles 60 would be pivotally connected rather than being pivotally connected to the cranks 64 on arms 24.

Moreover, the invention is not limited to the number of gangs 44 herein shown and described. Implements having floatable outer wing sections hingedly mounted thereon can also be provided with gangs 44 also controlled in the manner contemplated by our present invention.

We claim:

1. A farm implement comprising: a frame;
ground-engaging means having structure connecting the same with the frame in supporting relationship to the latter;
power means interconnecting said structure and the frame for raising and lowering the latter;
tillage means mounted on the frame for up and down movement therewith;
cutter means disposed ahead of said tillage means;
means mounting said cutter means on the frame for up and down movement in unison with the frame and with the tillage means in response to actuation of said power means whereby to control the depth of penetration of the tillage means and the cutter means into the ground,
said mounting means attaching the cutter means to the frame for up and down movement of the cutter means relative to the frame; and
mechanism operably coupling the cutter means with said structure for lowering the cutter means relative to the frame in response to raising of the frame by said power means,
said structure including a shaft carried by the frame rear-wardly of said mounting means and rockable about a second axis generally parallel with said horizontal axis, and arm means connecting the ground-engaging means with the shaft for up and down swinging movement of the arm means in response to rocking of the shaft, said power means being coupled with the shaft for rocking the latter.

2. The invention of claim 1, said mechanism having a pivotal joinder with the arm means for movement of said mechanism fore and aft of the implement in response to swinging movement of the arm means.

3. The invention of claim 2, said mechanism extending forwardly of said joinder and being provided with a second pivotal joinder with the cutter means adjacent said horizontal axis.

4. The invention of claim 3, said mechanism being extensible for varying the extent of ground penetration of the cutter means relative to the depth of ground penetration by the tillage means.

5. The invention of claim 1, said mechanism including turnbuckle means overlying the frame and extending fore and aft of the implement, a first pivotal joinder of said arm means with said turn-buckle means at the rearmost end of the latter adjacent said shaft, and a second pivotal joinder of said cutter means with said turnbuckle means at the foremost end of the latter adjacent said horizontal axis.

6. The invention of claim 5, said cutter means including two gangs of coulter blades, each provided with a turnbuckle means.

7. The invention of claim 6, each gang having a beam pivotally attached to the frame and C-shaped, blade-supporting springs secured to the beams and provided with concave edges facing rearwardly when the frame is raised.

8. The invention of claim 7, said tillage means including a plurality of cultivator shovels, each provided with an arcuate spring shank secured to the frame and having a forwardly facing concave edge.

* * * * *